United States Patent [19]

Yashuda et al.

[11] Patent Number: 4,822,850
[45] Date of Patent: Apr. 18, 1989

[54] MODIFIED POLYORGANOSILOXANE CONTAINING ISOCYANATE GROUP AND PROCESS FOR PREPARING THE SAME

[75] Inventors: Hirofumi Yashuda; Takahiro Saho; Nobumasa Ohtake; Takaharu Nakano, all of Yokohama, Japan

[73] Assignee: Chisso Corporation, Japan

[21] Appl. No.: 136,132

[22] Filed: Dec. 21, 1987

[30] Foreign Application Priority Data

Dec. 24, 1986 [JP] Japan ................................. 61-309773

[51] Int. Cl.$^4$ ........................................... C08G 77/04
[52] U.S. Cl. ........................................ 528/28; 528/13; 528/15; 528/18; 528/19; 528/21; 528/23; 556/414; 556/420
[58] Field of Search ....................... 528/28, 13, 15, 18, 528/19, 21, 23; 556/414, 420

[56] References Cited

U.S. PATENT DOCUMENTS 4,387,206 6/1983 Bayer et al. .......................... 528/28
4,644,046 2/1987 Yamada ................................ 528/28

OTHER PUBLICATIONS

Ghose, "Synthesis of Some Carbon-Functional Organosilicon Compounds", Journal of Organometallic Chemistry, 164, pp. 11-18 (1979).

*Primary Examiner*—Melvyn I. Marquis
*Attorney, Agent, or Firm*—Leydig, Voit & Mayer

[57] ABSTRACT

There is here provided a modifier for a resin containing an active hydrogen capable of reacting with an isocyanate group. The modifier of the present invention can give characteristics such as low frictional properties, water repellency, oil repellency and antithrombotic properties to the resin, and when the modifier of the present invention is used, neither bleeding phenomenon nor deterioration in mechanical strength takes place.

The present modifier comprises a modified polyorganosiloxane containing an isocyanate group which is represented by the general formula (A)

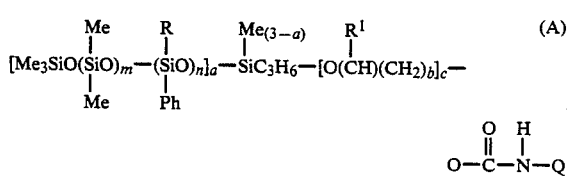

wherein Me is a methyl group, Ph is a phenyl group, R is a methyl or phenyl group, $R^1$ is H or a methyl group, each of m and n is 0 or more and a value of m+n is within the range of 0 to 600, a is 1, 2 or 3, b is 1, 2 or 3, c is a value of 1 to 300, and Q is a residue obtained by subtracting one isocyanate group from a compound having at least two isocyanate groups.

A process for preparing the compound having the general formula (A) comprises reacting a compound in which the moiety of —O—CO—NH—Q in the general formula (A) is not introduced yet thereinto, i.e., the moiety is —OH, with another compound having at least 2 isocyanate groups.

18 Claims, No Drawings

MODIFIED POLYORGANOSILOXANE CONTAINING ISOCYANATE GROUP AND PROCESS FOR PREPARING THE SAME

BACKGROUND OF THE INVENTION

1. Field of the Invention

The present invention relates to a modified polyorgano-siloxane having an isocyanate group at its one terminal and a process for preparing the same.

More specifically, the present invention relates to a modified polyorganosiloxane having an isocyanate group at its one terminal or terminal end which can be used as a modifier for a resin having an active hydrogen capable of reacting with the isocyanate group in order to provide the resin with low frictional properties, water repellency, oil repellency, antithrombotic properties and the like, and a process for preparing the modified polyorganosiloxane.

2. Description of the Prior Art

As polyorganosiloxanes having reactive organic groups, there are known polyorganosiloxanes having the reactive organic groups at both the terminals thereof, polyorgano-siloxanes having plural reactive organic groups on the side chains thereof, and the like. For the purpose of providing prevalent resins with water repellency, oil repellency, low frictional properties, antithrombotic properties and the like, the modification of the resins with these reactive polyorganosiloxanes has been heretofore carried out.

The simplest process for giving the above-mentioned characteristics of the polyorganosiloxane to the prevalent resins can be considered to be the polymer blend method. Further, other processes have been usually performed in which the polyorganosilxane having functional groups such as a silicon-bonding hydrogen group, silanol group, alcohol group or amino group at both the terminals thereof is used in a block copolymerization in order to introduce a polyorgano-siloxane chain into the main chain of the usual resin, thereby obtaining a block copolymer (e.g., Japanese Patent Application Laid-open Nos. 131,629/1984 and 238,315/1985).

In addition, in Japanese Patent Application Laid-open No. 189,257/1983, there is suggested a process in which an addition reaction type polyorganosiloxane is employed to form the so-called interdependent penetrating net structure (hereinafter referred to simply as IPN) from a usual thermoplastic resin and the polyorganosiloxane.

The above-mentioned polymer blend method is not practical, because the polyorganosiloxane inherently is a polymer having poor miscibility with the usual resin and therefore the polyorganosiloxane is liable to bleed on the surface of the mixture thereof.

In the block copolymerization method, the higher the content of the polyorganosiloxane, the greater the deterioration in mechanical strength which results from the polyorganosiloxane chain.

In the method in which the above-mentioned IPN is formed, the miscibility of the usual resin and the polyorganosiloxane with each other is poor, and thus it is difficult to form the uniformly distributed IPN. Therefore, if the polyorganosiloxane is not used in a high proportion at the cost of the deterioration in mechanical strength, sufficient improvement in characteristics cannot be obtained. In such a case, however, the bleeding phenomenon of the polyorganosiloxane takes place.

SUMMARY OF THE INVENTION

An object of the present invention is to provide a novel modified polyorganosiloxane containing an isocyanate group by which problems of conventional techniques can be solved and by which preferable characteristics such as low frictional properties, water repllency, oil repellency and antithrombotic properties can be given to a resin containing an active hydrogen or the like capable of reacting with the isocyanate group.

According to a first aspect of the present invention, there is provided a modified polyorganosiloxane containing an isocyanate group which is represented by the general formula (A)

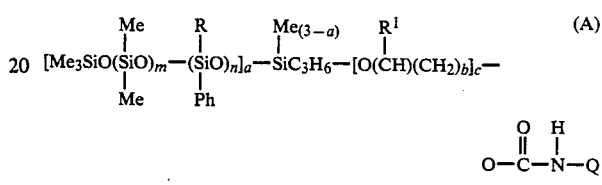

wherein Me is a methyl group, Ph is a phenyl group, R is a methyl or phenyl group, $R^1$ is H or a methyl group, each of m and n is 0 or more and a value of m+n is within the range of 0 to 600, a is 1, 2 or 3, b is 1, 2 or 3, c is a value of 1 to 300, and Q is a residue obtained by substracting one isocyanate group from a compound having at least two 8isocyanate groups.

According to a second aspect of the present invention, there is provided a process for preparing a modified polyorganosiloxane containing an isocyanate group represented by the general formula (A)

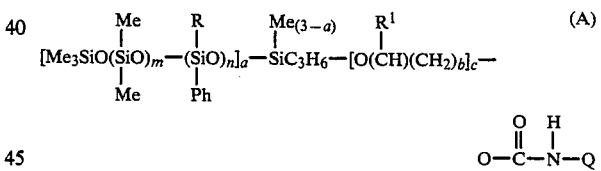

wherein Me is a methyl group, Ph is a phenyl group, R is a methyl or phenyl group, $R^1$ is H or a methyl group, each of m and n is 0 or more and a value of m+n is within the range of 0 to 600, a is 1, 2 or 3, b is 1, 2 or 3, c is a value of 1 to 300, and O is a residue obtained by substracting one isocyanate group from a compound having at least two isocyanate groups, by reacting a polyorganosiloxane having one modified terminal represented by the general formula (B)

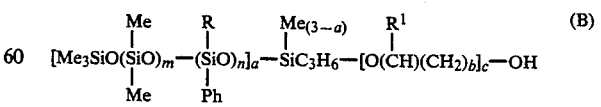

wherein the symbols and coefficients are as defined above, with a compound having at least two isocyanate groups in a molar ratio of 1 or more to the polyorganosiloxane at a temperature of 50° C. or more in the presence of a solvent.

DESCRIPTION OF THE PREFERRED EMBODIMENTS

The present invention is directed to a modified polyorganosiloxane containing an isocyanate group represented by the general formula (A)

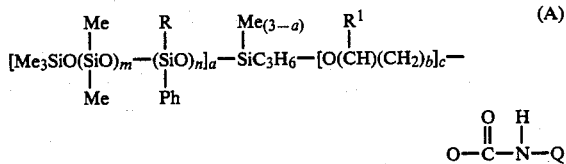

wherein Me is a methyl group, Ph is a phenyl group, R is a methyl or phenyl group, $R^1$ is H or a methyl group, each of m and n is 0 or more and a value of m+n is within the range of 0 to 600, a is 1, 2 or 3, b is 1, 2 or 3, c is a value of 1 to 300, and Q is a residue obtained by substracting one isocyanate group from a compound having at least two isocyanate groups.

In the general formula (A) mentioned above, a value of m+n is preferably from 10 to 120, and a=1 is preferred.

The isocyanate group in the general formula (A) may be the so-called block isocyanate which is blocked with one of alcohols, phenols, oximes, lactams, sodium bisulfates or the like.

The modified polyorganosiloxane containing the isocyanate group which is represented by the general formula (A) can be prepared by the second aspect of the present invention, i.e., by reacting a polyorganosiloxane having one modified terminal represented by the general formula (B)

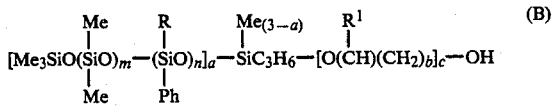

wherein the symbols and coefficients are as defined above, with a compound having at least two isocyanate groups in a molar ratio of 1 or more to the polyorganosiloxane at a temperature of 50° C. or more in the presence of a solvent.

The thus prepared compound can be reacted with a resin having an active hydrogen or the like in its molecular chain to form a structure in which a polyorganosiloxane chain branches from the side chain of the resin, or alternatively the polyorganosiloxane in which one terminal is hindered with an organic group having two or more isocyanate groups is reacted with a similar kind of resin to prepare a copolymer, thereby obtaining the structure in which the polyorganosiloxane chain branches from the side chain of the resin.

In this structure, the polyorganosiloxane chain branching from the side chain has another terminal which is a nonreactive trimethylsiloxy group, and therefore its behavior is not limited, with the result that characteristics based on the polyorganosiloxane chain are easy to appear.

From this behavior, it might be presumed that the polyorganosiloxane chain floats on the surface of a molded product in common with the above-mentioned polymer blend method in which the bleeding phenomenon occurs, but the polyorganosiloxane chain is chemically bound to the main chain of the resin and therefore any bleeding phenomenon of the polyorganosiloxane does not take place, so that an annoying sticky state on the product can be avoided.

Owing to such a functional effect, the resin modified with the modified polyorganosiloxane having the isocyanate group at its one terminal of the present invention can possess low frictional properties, i.e., good surface sliding properties and other preferable characteristics of the polyorganosiloxane, even if the modifier of the present invention is used in a small amount.

As described above, the modified polyorganosilixane having one isocyanate terminal of the present invention reacts with the resin having a reactive group such as an active hydrogen which can easily react with the isocyanate, whereby the polysiloxane is introduced into the side chain of the resin. Examples of such resins include polyurethanes, polyamides, polyvinyl alcohols, phenol resins, epoxy resins, urea resins, melamine resins, phenoxy resins, polyamide-imide resins and cellulosic resins. It should be noted that the structure in which the polysiloxane chain branches from the side chain of the resin can provide low frictional properties, i.e., good surface sliding properties and other preferable characteristics of the polyorganosiloxane.

Now, reference will be made in detail to the constitution of the present invention.

The compound having at least two isocyanate groups used in the present invention is not limited at all. Examples of such compounds each having at least two isocyanate groups include compounds usually called diisocyanates, for example, tolylene diisocyanate, diphenylmethane diisocyanate, dianisidine diisocyanate, diphenyl ether diisocyanate, ditolylene diisocyanate, naphthalene diisocyanate, hexamethylene diisocyanate, isophorone diisocyanate, lysine diisocyanate methyl ester, meta-xylene diisocyanate, 2,2,4-trimethylhexamethylene diisocyanate, dimer acid diisocyanate, isopropylidene bis(4-cyclohexyl isocyanate) and cyclohexylmethane diisocyanate dimer. In addition, the compounds having three or more isocyanate groups can also be used in the present invention, and examples of such compounds include triphenylmethane triisocyanate, triisocyanate phenyl thiophosphate, biurets and cyanurates of the above-mentioned diisocyanates, and adducts of the diisocyanates and polyvalent alcohols such as trimethylolpropane and trimethylolethane. Moreover, there can be also used prepolymers, having two or more isocyanate residues, of these isocyanate group-containing compounds and polyvalent alcohols or compounds having two or more amino groups. In short, substantially all compounds can be used in the present invention in so far as they have two or more isocyanate groups.

Furthermore, the so-called block isocyanates can also be used in which each isocyanate group is blocked with one of alcohols, phenols, oximes, lactams, sodium bisulfates or the like.

One material used in the present invention, i.e., the modified polyorganosiloxane having the general formula (B) in which one terminal is modified with a $-C_3H_6-[O(CHR^1)-(CH_2)_b]_c-OH$ group can be prepared by treating a compound having the general formula (E)

$$[Me_3SiO(Me_2SiO)_m-(RPhSiO)_n]_a-\underset{\underset{Me_{(3-a)}}{|}}{Si}C_3H_6-[O(CHR^1)(CH_2)_b]_c-OSiMe_3 \quad (E)$$

wherein Me is a methyl group, Ph is a phenyl group, R is a methyl or phenyl group, $R^1$ is H or a methyl group, each of m and n is 0 or more and a value of m+n is within the range of 0 to 600, a is 1, 2 or 3, b is 1, 2 or 3, and c is a value of 1 to 300, with a lower alcohol or aqueous hydrochloric acid solution in order to eliminate the trimethylsilyl group from the formula (E).

Here, the latter compound having the general formula (E) can be prepared by the addition reaction hydrosilyl introduction reaction of an H-modified polyorganosiloxane represented by the general formula (C)

$$[Me_3SiO(Me_2SiO)_m-(RPhSiO)_n]_a-\underset{\underset{Me_{(3-a)}}{|}}{Si}-H \quad (C)$$

wherein the symbols and coefficients are as defined above, into a compound represented by the general formula (D)

$$CH_2=CHCH_2-[O(CHR^1)(CH_2)_b]_c-OSiMe_3 \ldots \quad (D)$$

wherein the symbols and coefficients are as defined above.

Further, the above-mentioned polyorganosiloxane having the general formula (C) can be prepared by reacting a living polymer represented by the general formula (F)

$$Me_3SiO(Me_2SiO)_m-(RPhSiO)_n-M \ldots \quad (F)$$

wherein M is Na or Li, and the other symbols and coefficients are as defined above, with a chlorosilane compound having a silicon-bonding hydrogen represented by the general formula (G)

$$Cl_a-\underset{\underset{Me_{(3-a)}}{|}}{Si}-H \quad (G)$$

wherein the symbol and coefficient are as defined above.

The above-mentioned compound (D) can be prepared by replacing the OH group of an unsaturated bond-including compound represented by the general formula $$CH_2=CHCH_2-[O(CHR^1)(CH_2)_b]_c-OH$$

wherein the symbol and coefficients are as defined above, with a silyl group by the use of a silyl group-introducing agent such as hexamethyldisilazane.

The respective reaction steps mentioned above can be carried out by well-known procedures and conditions without needing any special techniques.

Needless to say, the compound of the general formula (E) may be synthesized by the following procedure in some cases: The hydrosilyl introduction reaction between the compound of the general formula (D) and the chlorosilane compound of the general formula (G) may be previously performed, and then the resulting reaction product may be reacted with the living polymer of the general formula (F).

Now, reference will be made to a process of the present invention for preparing the modified polyorganosiloxane having at least one isocyanate group at one terminal of its molecular chain from the modified polyorganosiloxane having the general formula (B) obtained in the aforesaid manner and the compound having at least two isocyanate groups.

The reaction between the compound of the general formula (B) and the compound having at least two isocyanate groups is basically a reaction of the —OH group of the general formula (B) compound and the —NCO group of the isocyanate compound, i.e., a reaction of forming the so-called urethane bond:

$$(-O-\underset{\underset{O}{\|}}{C}-\underset{\underset{H}{|}}{N}-)$$

In order to assure a uniform and perfect reaction, it is preferred to make use of a solvent. In the present invention, it can be recommended to employ a solvent which is unreactive toward to the isocyanate group and which can dissolve both the isocyanate compound and polysiloxane.

Examples of such solvents include aromatic halides such as monochlorobenzene and dichlorobenzenes; esters such as methylisobutyl acetate and methoxybutyl acetate; ketones such as methyl isobutyl ketone, cyclohexanone; and ethers such as butyl ether, dioxane, anisole, methoxytoluene, propylene glycol dimethyl ether and diethylene glycol dimethyl ether.

In the presence of such a type of solvent, the modified polyorganosiloxane of the general formula (B) is thermally reacted with the isocyanate compound at a reaction temperature of 50° C. or more. In this case, a molar ratio between these materials should be within the range satisfying the relation of [isocyanate compound/modified polyorganosiloxane≧1].

From the resulting reaction solution, excess contents of the solvent and isocyanate are distilled off, thereby obtaining the modified polyorganosiloxane of the present invention represented by the general formula (A) having at least one isocyanate group at one terminal of its molecular chain.

The compound represented by the general formula (A) having two or more isocyanate groups can be conveniently synthesized when the above-mentioned molar ratio is 1 or more, because after one isocyanate group has been reacted, the other isocyanate groups are less reactive.

The excess isocyanate compound can be recovered by distillation together with the solvent and can then be reused, and therefore there is not a strong reason for deciding the upper limit of the above molar ratio. However, it is usually almost meaningless that the above-mentioned molar ratio is over 3 in the reaction.

However, when the molar ratio is less than 1, by-products are unpreferably formed in which the compound of the general formula (A) is additionally reacted with the general formula (B) compound.

When the molar ratio of the isocyanate compound to the modified polyorganosiloxane of the general formula (B) is 1, the product solution may be used intact as a solvent type of resin modifier without distilling off the solvent.

The reaction temperature is preferably at least 50° C. so as to perform the reaction effectively, and if the temperature is lower than this level, it will take a long period of time to complete the reaction. With regard to the upper limit of the reaction temperature, there is not any strong reason for deciding it expressly, since a high temperature does not have any bad influence on the reaction itself. Except when the reaction is conducted under pressure, the upper limit of the reaction temperature can be considered to be controlled by the boiling point of the solvent used or isocyanate compound, and from these viewpoints, the upper limit of the reaction temperature of about 150° C. is proper. After the completion of the urethane bond reaction, the product may be further treated with one of alcohols, phenols, oximes or the like so as to form a block type polymer having excellent storage stability.

In the present invention, a catalyst to accelerate the reaction may be used without any trouble. Examples of such catalysts include acid catalysts such as inorganic acids, esters of phosphoric acid and boric acid, and paratoluenesulfonic acid; amine catalysts such as N-methylmorpholine, triethylamine, N,N-dimethylbenzylamine, N,N'-dimethylpiperazine, triethylenediamine, N,N,N',N'-tetramethylethylenediamine, N,N,N',N'-tetramethylhexamethylenediamine, N,N',N'',N''-pentamethyldiethylenetriamine, hexamethylenetetramine and 1,8-diazabicyclo[5,4,0]-7-undecene (D.B.U.); and metal catalysts such as cobalt naphthenate, lead naphthenate, zinc naphthenate, stannous chloride, stannic chloride, tri-n-butyltin acetate, trimethyltin hydroxide, dimethyltin dichloride, dibutyltin dilaurate, stannous octylate, tetraoctyl titanate, cobalt octylate and antimony trichloride.

When reacting with a resin having an active hydrogen or the like on its molecular chain, the modified polyorgano-siloxane containing the isocyanate group of the present invention can take the structure in which a polyorgano-siloxane chain branches from a side chain of the resin. This polyorganosiloxane chain branching from the side chain has another terminal which is a nonreactive trimethylsiloxy group, and therefore the behavior of the chain cannot be limited. In consquenece, the resin can be provided with characteristics based on the polyorganosiloxane chain, i.e., low frictional properties, water repellency, oil repellency, antithrombotic properties and the like. Further, since this chain is chemically bound to the main chain of the resin, any bleeding phenomenon does not take place. Furthermore, even if the modifier of the present invention is used in a small amount, the low frictional properites, i.e., sliding properties on the surface of the product and other characteristics of the polyorganosiloxane can be obtained sufficiently.

Therefore, when the modified polyorganosiloxane containing the isocyanate group of the present invention is used as the modifier for the resin having the active hydrogen capable of reacting with the isocyanate group, the resin can be provided with characteristics such as low frictional properties, water repellency, oil repellency and antithrombotic properties, as described above, even if the amount of the modifier is small. In addition, such a bleeding phenomenon as in the conventional blend method does not occur at all, and such a deterioration in mechanical strength as in the block copolymerization method does not take place, either. As is apparent from the foregoing, the present invention has excellent and practical effects.

Also in the process for preparing the modified polyorganosiloxane containing the isocyanate group, it can be manufactured from the modified polyorganosiloxane which has a structure of $-C_3H_6-[O-(CHR')-(CH_2)_b]_c-OH$ at one terminal and the compound having at least 2 isocyanate groups in accordance with an urethane bond reaction, as described above. Therefore, the compound of the present invention can be conveniently prepared easily by dissolving these materials in a solvent and then performing an extremely moderate reaction at a temperature of 50° C. or more.

The present invention is very useful as a modifier for resins and as its manufacturing process.

EXAMPLES

The present invention will be described in detail by way of examples, but it should not be limited to these examples.

EXAMPLE 1

In a reaction flask were placed 44.7 g of a modified polysiloxane having one modified terminal, 2.5 g of 4,4'-diphenylmethane diisocyanate, 0.01 g of triethylamine and 100 g of dried 1,4-dioxane, and they were stirred at 80°C. for 2 hours. With regard to the above modified polysiloxane, it had a $-C_3H_6OC_2H_4OH$ group on the terminal end of its molecular chain and contained 0.38% by weight of OH, its molecular weight was 4,470, its viscosity at 25° C. was 94 cP, and it had the formula

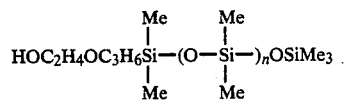

wherein Me is a methyl group.

With regard to the above 4,4'-diphenylmethane diisocyanate, its purity was 99.9%, it contained 0.001% of hydrolyzable chlorine, its solidification point was 39.1° C., and its molar ratio to the modified polysiloxane was 1.0.

Next, 1,4-dioxane was distilled off at 70° C. under reduced pressure, so that about 47 g of a white viscous liquid was obtained.

For this viscous liquid, an infrared absorption spectrum analysis was carried out, and it was observed that a band attributable to the OH group of the alcohol at 3,600 to 3,400 cm$^{-1}$ had vanished, and that a band attributable to the NH group of the urethane bond ($-N-H-CO-O-$) and a band attributable to the C=O group of the urethane bond were present at 3,330 cm$^{-1}$ and at 1,710 cm$^{-1}$, respectively. In addition, a band attributable to the isocyanate group and a band attributable to the siloxane bond were present at 2,355 cm$^{-1}$ and at 1,000 to 1,120 cm$^{-1}$, respectively.

From the results of the infrared absorption spectrum analysis and the manufacturing process described above, it was confirmed that the viscous liquid was a modified polysiloxane having one isocyanate group terminal which corresponded to the following molecular formula

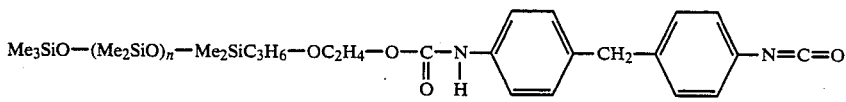

wherein Me is a methyl group and n is about 57.

EXAMPLE 2

In a reaction flask were place 44.7 g of a modified polysiloxane, 9.4 g (7.1 g in terms of a solid content) of a triisocyanate compound, 0.01 g of triethylamine and 100 g of dried 1,4-dioxane, and they were stirred at 80° C. for 2 hours. With regard to the above modified polysiloxane, it had a $-C_3H_6OC_2H_4OH$ group on the terminal end of its molecular chain and contained 0.38% by weight of OH, its molecular weight was 4,470, and its viscosity at 25° C. was 94 cP. With regard to the above triisocyanate compound, it contained 13.4% of NCO and 75.6% of a solid content (a solvent was ethyl acetate), it was made by Nippon Polyurethane Industry Co., Ltd. and sold under the trade name Coronate L, a molar ratio of its NCO content to the modified polysiloxane was 1.0, and it had the formula:

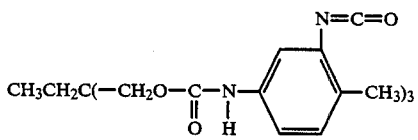

Afterward, 1,4-dioxane was distilled off at 70° C. under reduced pressure, so that about 51.5 g of a light yellow viscous liquid was obtained.

For this viscous liquid, an infrared absorption spectrum analysis was carried out, and it was observed that a band attributable to the NH group of the urethane bond and a band attributable to the C=O group of the urethane bond were present at 3,310 cm$^{-1}$ and at 1,710 cm$^{-1}$, respectively.

In addition, a band attributable to the isocyanate group and a band based on the siloxane bond were present at 2,335 cm$^{-1}$ and at 1,000 to 1,120 cm$^{-1}$, respectively.

From the results of the infrared absorption spectrum analysis and the manufacturing process described above, it was confirmed that the viscous liquid was a modified polysiloxane having one isocyanate group terminal which corresponded to the following molecular formula

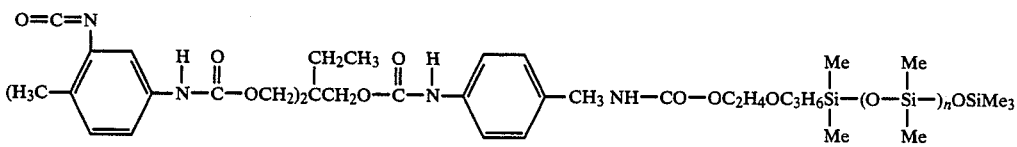

wherein Me is a methyl group and n is about 57.

What is claimed is:

1. A modified polyorganosiloxane containing an isocyanate group which is represented by the general formula (A)

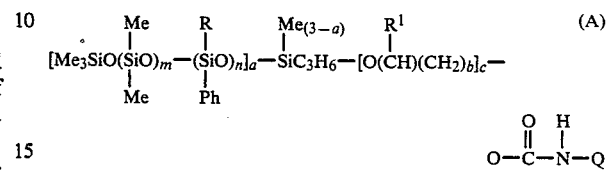

wherein Me is a methyl group, Ph is a phenyl group, R is a methyl or phenyl group, R$^1$ is H or a methyl group, each of m and n is 0 or more and a value of m+n is within the range of 0 to 600, a is 1, 2 or 3, b is 1, 2 or 3, c is a value of 1 to 300, and Q is a residue having at least one isocyanate group derived from a compound having at least two isocyanate groups.

2. A modified polyorganosiloxane containing an isocyanate group according to claim 1 wherein said value of m+n in said general formula (A) is within the range of 10 to 120.

3. A modified polyorganosiloxane containing an isocyanate group according to claim 1 wherein said value of a in said general formula (A) is 1.

4. A modified polyorganosiloxane containing an isocyanate group according to claim 1 wherein in said general formula (A), said value of m+n is within the range of 10 to 120, and said value of a is 1.

5. A modified polyorganosiloxane containing an isocyanate group according to claim 1 wherein the isocyanate group in said general formula (A) is blocked.

6. A modified polyorganosiloxane containing an isocyanate group according to claim 1 wherein in said general formula (A), said value of m+n is within the range of 10 to 120, and said isocyanate group is blocked.

7. A modified polyorganosiloxane containing an isocyanate group according to claim 1 wherein in said general formula (A), said value of a is 1, and said isocyanate group is blocked.

8. A modified polyorganosiloxane containing an isocyanate group according to claim 1 wherein in said general formula (A), said value of m+n is within the range of 10 to 120, said value of a is 1, and said isocyanate group is blocked.

9. A process for preparing a modified polyorganosiloxane containing an isocyanate group represented by the general formula (A)

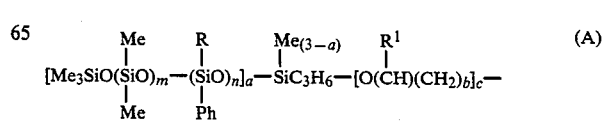

-continued comprising reacting a polyorganosiloxane having one modified terminal group representing by the general formula (B)

$$[Me_3SiO(\underset{Me}{\underset{|}{Si}}O)_m-(\underset{Ph}{\underset{|}{Si}}O)_n]_a-SiC_3H_6-[O(\overset{R^1}{\overset{|}{CH}})(CH_2)_b]_c-OH \quad (B)$$

with at least one compound having at least two isocyanate groups in a molar ratio of the isocyanate group-containing compound to the polyorganosiloxane of at least 1:1, at a temperature of 50° C. or more in the presence of a solvent, wherein Me is a methyl group, Ph is a phenyl group, R is a methyl or phenyl group, $R^1$ is H or a methyl group, each of m and n is 0 or more and a value of m+n is within the range of 0 to 600, a is 1, 2 or 3, b is 1, 2 or 3, c is a value of 1 to 300, and Q is a residue having at least one isocyanate group derived from a compound having at least two isocyanate groups.

10. A process for preparing a modified polyorganosiloxane containing an isocyanate group according to claim 9 wherein said at least one compound having at least two isocyanate groups is one or more selected from the group consisting of tolylene diisocyanate, diphenylmethane diisocyanate, dianisidine diisocyanate, diphenyl ether diisocyanate, ditolylene diisocyanate, naphthalene diisocyanate, hexamethylene diisocyanate, isophorone diisocyanate, lysine diisocyanate methyl ester, meta-xylene diisocyanate, 2,2,4-trimethylhexamethylene diisocyanate, dimer acid diisocyanate, isopropylidene bis(4-cyclohexyl isocyanate), cyclohexylmethane diisocyanate dimer, triphenylmethane triisocyanate, triisocyanate phenyl thiophosphate, a biuret of a diisocyanate, a cyanurate of a diisocyanate, an adduct of a diisocyanate and trimethylolpropane, an adduct of a diisocyanate and trimethylolethane, a prepolymer having two or more isocyanate residues of said isocyanate group-containing compound and a polyvalent alcohol, and a prepolymer having two or more isocyanate residues of said isocyanate group-containing compound and a compound having two or more amino groups.

11. A process for preparing a modified polyorganosiloxane containing an isocyanate group according to claim 9 wherein said modified polyorganosiloxane having the general formula (B) is prepared by reacting a compound having the general formula (E)

$$[Me_3SiO(Me_2SiO)_m-(RPhSiO)_n]_a-\underset{Me_{(3-a)}}{\underset{|}{Si}}C_3H_6-[O(CHR^1)(CH_2)_b]_c-OSiMe_3 \quad (E)$$

with a lower alcohol or aqueous hydrochloric acid solution in order to eliminate the trimethylsilyl group from the formula (E), said compound having the general formula (E) being prepared by the addition reaction of an H-modified polyorganosiloxane represented by the general formula (C)

$$[Me_3SiO(Me_2SiO)_m-(RPhSiO)_n]-\underset{Me_{(3-a)}}{\underset{|}{Si}}-H \quad (C)$$

with a compound represented by the general formula (D)

$$CH_2=CHCH_2-[O(CHR^1)(CH)_b]_c-OSiMe_3 \quad (D)$$

wherein Me is a methyl group, Ph is a phenyl group, R is a methyl or phenyl group, $R^1$ is H or a methyl group, each of m and n is 0 or more and a value of m+n is within the range of 0 to 600, a is 1, 2 or 3, b is 1, 2 or 3, and c is a value of 1 to 300.

12. A process for preparing a modified polyorganosiloxane containing an isocyanate group according to claim 9 wherein said value of m+n in said general formula (A) is within the range of 10 to 120.

13. A process for preparing a modified polyorganosiloxane containing an isocyanate group according to claim 9 wherein said value of a in said general formula (A) is 1.

14. A process for preparing a modified polyorganosiloxane containing an isocyanate group according to claim 9 wherein in said general formula (A), said value of m+n is within the range of 10 to 120, and said value of a is 1.

15. A process for preparing a modified polyorganosiloxane containing an isocyanate group according to claim 9 wherein the isocyanate group in said general formula (A) is blocked.

16. A process for preparing a modified polyorganosiloxane containing an isocyanate group according to claim 9 wherein in said general formula (A), said value of m+n is within the range of 10 to 120, and said isocyanate group is blocked.

17. A process for preparing a modified polyorganosiloxane containing an isocyanate group according to claim 9 wherein in said general formula (A), said value of a is 1, and said isocyanate group is blocked.

18. A process for preparing a modified polyorganosiloxane containing an isocyanate group according to claim 9 wherein in said general formula (A), said value of m+n is within the range of 10 to 120, said value of a is 1, and said isocyanate group is blocked.

* * * * *